US007509151B1

(12) United States Patent
Edwards (10) Patent No.: US 7,509,151 B1
(45) Date of Patent: Mar. 24, 2009

(54) PHONE FOR THE VISUALLY IMPAIRED WITH DUAL BATTERY ARRANGEMENT

(75) Inventor: Christopher M. Edwards, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 593 days.

(21) Appl. No.: 11/063,431

(22) Filed: Feb. 22, 2005

Related U.S. Application Data (63) Continuation-in-part of application No. 10/980,592, filed on Nov. 3, 2004.

(51) Int. Cl.
*H04M 1/00* (2006.01)

(52) U.S. Cl. .............. 455/575.1; 455/575.2; 455/575.3; 455/575.4

(58) Field of Classification Search .............. 455/575.1, 455/572, 573
See application file for complete search history.

(56) References Cited

U.S. PATENT DOCUMENTS

| | | | | |
|---|---|---|---|---|
| 4,394,649 | A * | 7/1983 | Suchoff et al. .............. 345/168 |
| 5,999,832 | A * | 12/1999 | Vannatta et al. .......... 455/575.1 |
| 6,016,423 | A * | 1/2000 | Ross et al. ................. 455/90.3 |
| 6,404,168 | B1 | 6/2002 | Shoji .......................... 320/134 |
| 6,496,685 | B2 * | 12/2002 | Peterzell et al. ............ 455/90.1 |
| 6,517,967 | B1 | 2/2003 | Shrim et al. ................. 429/148 |
| 6,551,276 | B1 * | 4/2003 | Mann et al. ................. 604/131 |
| 6,668,179 | B2 | 12/2003 | Jiang .......................... 455/572 |
| 7,187,363 | B2 * | 3/2007 | Nguyen et al. .............. 345/168 |
| 2002/0033690 | A1 * | 3/2002 | Karpiel et al. .............. 320/107 |
| 2003/0078069 | A1 * | 4/2003 | Lindeman .................... 455/550 |
| 2003/0103041 | A1 * | 6/2003 | Nguyen et al. .............. 345/168 |
| 2003/0224831 | A1 * | 12/2003 | Engstrom et al. ........... 455/566 |
| 2004/0160417 | A1 * | 8/2004 | Mandel ....................... 345/168 |
| 2004/0227733 | A1 * | 11/2004 | Fyke et al. .................. 345/168 |
| 2005/0276005 | A1 * | 12/2005 | Pantsu et al. ................ 361/683 |
| 2006/0006995 | A1 * | 1/2006 | Tabankin et al. ............ 340/521 |
| 2006/0061555 | A1 * | 3/2006 | Mullen ....................... 345/169 |
| 2006/0063571 | A1 * | 3/2006 | Chadha .................... 455/575.3 |
| 2007/0008292 | A1 * | 1/2007 | Fyke et al. .................. 345/169 |
| 2007/0146330 | A1 * | 6/2007 | Nguyen et al. .............. 345/169 |

OTHER PUBLICATIONS

Office action from U.S. Appl. No. 10/980,592, dated Sep. 25, 2007.
Office action from U.S. Appl. No. 10/980,592, dated Mar. 6, 2008.
Office action from U.S. Appl. No. 10/980,592, dated Nov. 6, 2008.

* cited by examiner

*Primary Examiner*—Matthew D Anderson
*Assistant Examiner*—Adel Youssef (57) ABSTRACT

A phone having an elongated housing with a top surface and a bottom surface. The phone includes a display screen affixed to the housing. The display screen forms a majority of the surface area of the top surface of the housing. The phone also includes a keypad having a plurality of keys corresponding with the digits 0-9. The plurality of keys are sequentially positioned along a side of the display on the top surface. The key for the digit 0 is adjacent to either the key for the digit 1 or the key for the digit 9. The phone further includes a first battery and a second battery that are coupled with the housing. In operation, the first and second batteries cooperatively provide power to operate the phone.

20 Claims, 5 Drawing Sheets

PHONE FOR THE VISUALLY IMPAIRED WITH DUAL BATTERY ARRANGEMENT

CROSS REFERENCE TO RELATED APPLICATIONS

This application claims the benefit under 35 U.S.C. § 120 of U.S. patent application Ser. No. 10/980,592, filed Nov. 3, 2004 as a continuation-in-part application. The disclosure of U.S. patent application Ser. No. 10/980,592 is incorporated herein in its entirety.

BACKGROUND

1. Field

The present invention is directed to a phone and more particularly to a phone having a keypad that provides for ease of use for the visually impaired.

2. Description of Related Art

The use of portable phones has increased greatly over the last several years. Most mobile phones that have been manufactured use a fairly common layout. They typically come in either a clamshell or "candy bar" chassis layout with a small rectangular screen at the top and an array of keypad buttons beneath the screen. The keypad buttons are typically arranged in a four by three grid. For example, the numbers 1, 2, and 3 across the top row, the numbers 4, 5, and 6 across the second row, beneath the first row, the numbers 7, 8, and 9 in the third row beneath the second row, and the *, 0, # across the fourth row beneath the third row.

Over the years, mobile phones have become increasingly smaller in size, with smaller keypads and smaller displays. As the phones have become smaller in size, the keypads and displays have also become smaller in size. Even for individuals having perfect vision, it is sometimes difficult to see and to manipulate the keypad, and to see the characters on the display. For individuals having impaired eyesight, or who are farsighted, or even legally blind, it is even more difficult to see and manipulate the keypad, and view the display. Accordingly, there is a need to provide a mobile phone that is more easy to use for individuals having impaired vision, farsightedness, or who are legally blind.

Figure 1A:
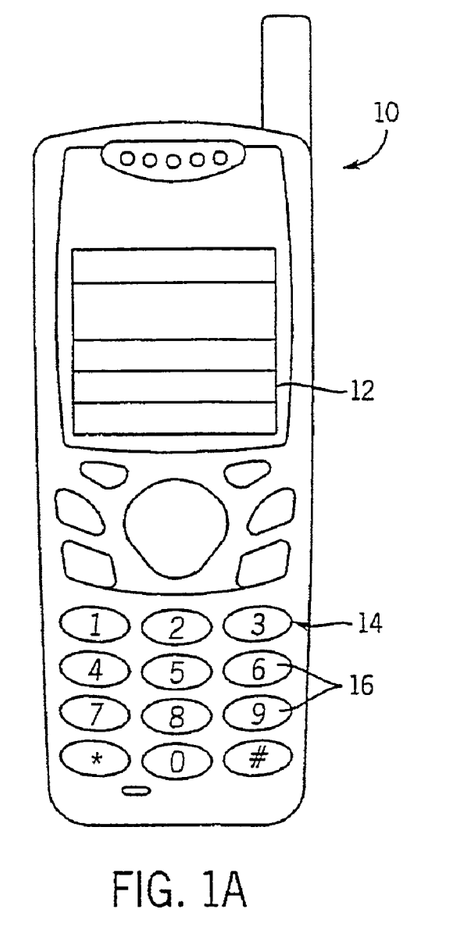
FIG. 1A shows a top view of a prior art mobile phone having a candy bar chassis and a conventional layout of the display screen and keypad.
Figure 1B:
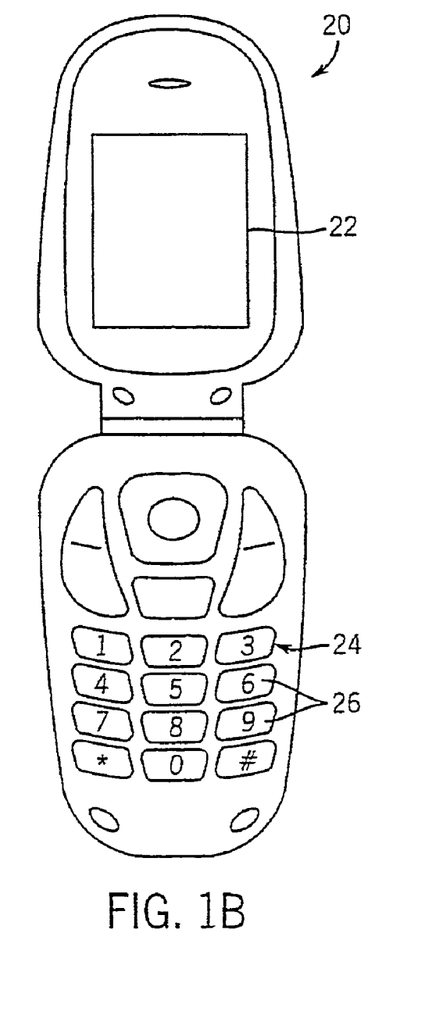
FIG. 1B shows a top view of a prior art mobile phone having a clamshell chassis and a conventional layout of the display screen and keypad.

FIG. 1A shows a top view of such a prior art mobile phone 10 having a "candy bar" chassis configuration and a conventional layout of the display screen 12 and keypad 14. FIG. 1B shows a top view of another such prior art mobile phone 20 having a clamshell chassis and a conventional layout of the display screen 22 and keypad 24. Mobile phones 10 and 20 each have a small rectangular display screen 12, 22 at the top and an array of keypad buttons 16, 26 beneath the screen. The keypad buttons 16, 26 are arranged in a four by three grid. Thus, the numbers 1, 2, and 3 are across the top row, the numbers 4, 5, and 6 are across the second row, beneath the first row, the numbers 7, 8, and 9 are in the third row beneath the second row, and the characters *, 0, # are across the fourth row beneath the third row.

SUMMARY

The present embodiments may include a phone having a specialized keypad that is adapted to allow for easier input by a user. For example, in one embodiment, the keypad has keys for the digits 0-9 that are placed sequentially along a lengthwise edge of the phone. This arrangement of the keys provides for greater ease in locating and manipulating the keys and also allows the keys to be of a larger size to provide easier viewing of the keys. With this arrangement, the keys may also be larger in size and contain greater spacing between keys than is possible with phones having a four by three grid layout.

The present embodiments may also include a display screen utilizing a "landscape" view (width greater than height) positioned above the keypad, as opposed to the typical "portrait" view (height greater than width) commonly found on most mobile phones. With a landscape view, a larger font can be used, making numbers entered into the phone easier to see. In addition, the display may also be enlarged in a lengthwise direction. When the numbers are keyed into the phone, the larger display allows for the entered numbers to appear in a larger size than usual. The user may view the entered numbers shown on the display to ensure that the proper numbers have been entered. Because such displays may consume more power than displays used in current phones, it is desirable to provide additional power resources with such phones to achieve longer battery life (the amount of time between charging the batteries). In one embodiment, a dual battery arrangement is implemented where the batteries are electrically coupled in parallel. Such an arrangement allows for "hot swapping" batteries without the need to power off the phone or to lose connection when replacing discharged batteries. Further, such an approach allows for the use of batteries in existing form factors and, therefore, reduces that need to design and manufacture a new larger capacity battery to meet the power consumption needs of such phones.

In one embodiment, the keys are raised from the phone chassis to allow for easier manipulation, and the keys may also include the Braille representation for each number in raised format on the keys themselves.

Thus, the present embodiments provide a mobile phone having improved keypad visibility and ease of use. The mobile phone may also have larger and more visible keys, and possibly having increased spacing between keys. The mobile phone may also include raised Braille representations for each number in raised format on the keys themselves. The phone may also utilize a landscape layout allowing for a larger display area and a larger font size showing the entered numbers to improve visibility and ease of use.

These and other aspects will become apparent to those of ordinary skill in the art by reading the following detailed description, with reference, where appropriate, to the accompanying drawings. Further, it should be understood that the embodiments noted in this summary are only examples and not intended to limit the scope of the invention as claimed.

BRIEF DESCRIPTION OF THE DRAWINGS

Further advantages of the present invention will become apparent to those skilled in the art with the benefit of the following detailed description of the preferred embodiments and upon reference to the accompanying drawings in which.

DETAILED DESCRIPTION

Figure 2:
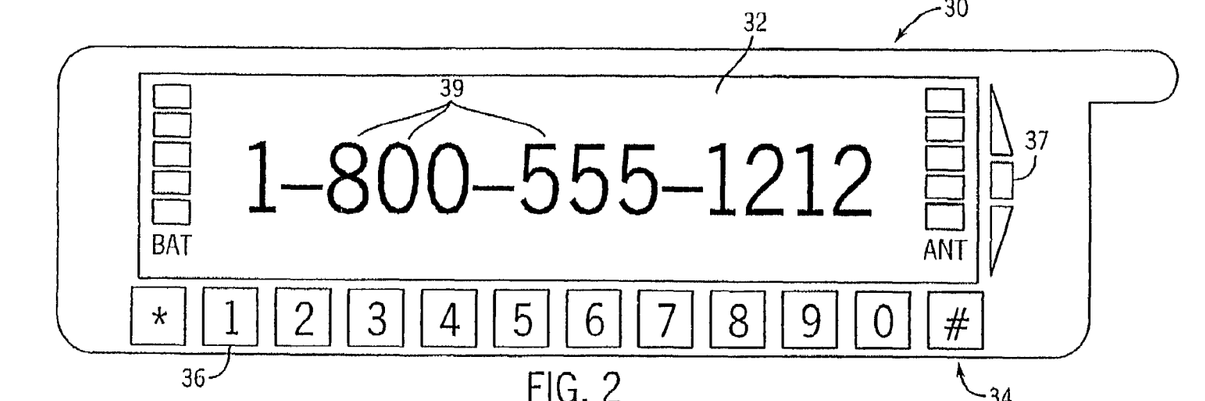
FIG. 2 is a top view of a phone having an improved keypad layout and display with a landscape view.

FIG. 2 shows an embodiment of a mobile phone 30 having a display screen 32 that shows numeric characters displayed in a landscape format. The display screen 32 may be enlarged from a conventional display screen. An enlarged display screen and a display screen having a landscape view both allow the numeric characters of entered numbers to be displayed in an enlarged fashion, with a larger font, which provides for easier viewing of the displayed numeric characters 39. In addition, people with lower visual acuity often have trouble distinguishing characters from their background, particularly when the characters are placed on a similarly colored background. A screen providing very high contrast may be used to improve character visibility. High contrast may be achieved by having an Organic Light Emitting Diode screen (OLED), which allows for extremely high contrast as well as a wide array of colors. OLED however is fairly costly and consumes a lot of power. Alternatively, an electroluminescent (EL) screen may be used. EL technology is less expensive and provides a high level of contrast, although it usually only allows for one color.

FIG. 2 also includes an improved keyboard 34 positioned beneath the display screen 32 positioned along a lengthwise side of the mobile phone 30. The keypad 34 includes buttons or keys 36 positioned in a sequential fashion in a straight line. Numbers 1-9, 0, and the characters *, and # are included. The layout of the keypad provides for improved ease of use. The keys 36 can have a greater spacing allowing for easier key manipulation. The keys 36 may also be larger in size than conventional keys and with the number of each key prominently displayed allowing them to be more easily viewed. With this layout, even the visually impaired can select the correct key. Navigation controls 37 are shown having menu navigation in a rolodex fashion with up and down navigation arrows on the side and a simple select button in between the two arrows.

Figure 3:
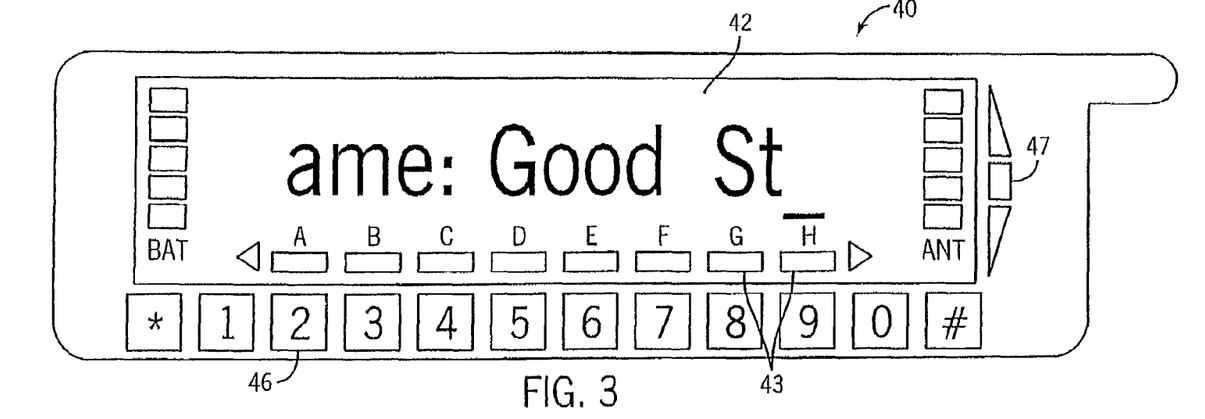
FIG. 3 is another top view of the phone of FIG. 2, having alpha characters appearing as soft keys on the display screen in a landscape format.

FIG. 3 shows mobile phone 40 having variable alphabetical character soft keys 43 positioned on the lower portion of the display screen 42. The alphabetical character soft keys 43 can be accessed and varied by scrolling through the soft keys by using the navigation controls 47. With this arrangement of alphabetical character soft keys, the numeric keys 46 do not need to include alphabetical characters as well as numeric characters, as is typically found on conventional keypads.

Figure 4:
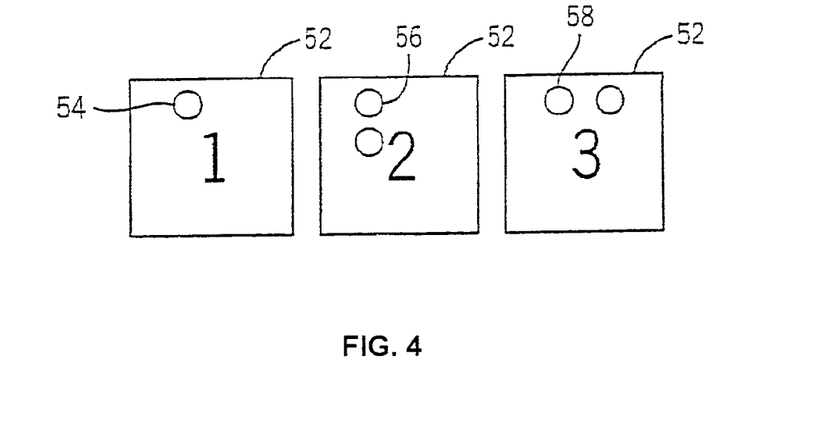
FIG. 4 is a top view of keys having numeric characters shown and also including the Braille representation of the number.

FIG. 4 shows numeric keys 52 having Braille representations 54, 56, and 58 representing the number on the key. The Braille representations 54, 56, and 58 provide for additional ease of use for those having visual impairment. The keys 52 may also be backlit to allow the numeric characters to be more easily seen.

Figure 5:
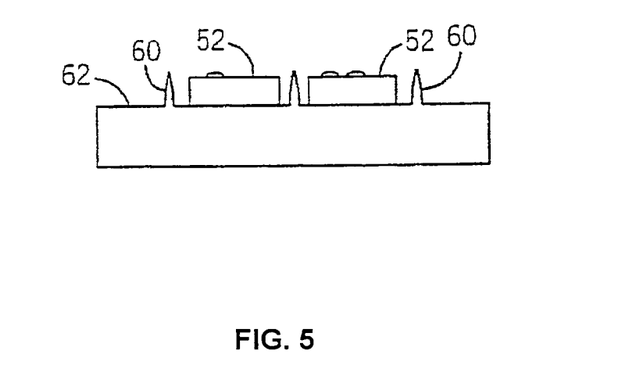
FIG. 5 is a side view of keys of the keypad shown raised above the surface of the phone casing and including ridges between the respective keys.

FIG. 5 shows a side view of the keys 52 that are raised from a surface of the phone casing 62. The keys may preferably be raised from the surface of the phone casing 62 by 2-3 mm to allow for better distinction between keys. Individuals with lower visual acuity rely heavily on tactile input. Therefore, the raised keys 52 provide for improved operation and accuracy. For similar reasons, the keys 52 are preferably made from a material that is noticeably different from the phone casing itself. Therefore, rubberized keys are preferably used. In addition, because raised keys 52 may create a problem of pressing the keys while in a pants pocket, small ridges 60, approximately the same height of the keys, should be positioned between the keys 52.

The enlarged display screen of the phone 30 shown in FIG. 2 and the phone 40 shown in FIG. 3 will typically consume power at a faster rate than phones having smaller displays, such as the phones shown in FIGS. 1A and 1B. Therefore, it is desirable to provide additional power resources for operating such phones in order for such phones have acceptable battery lifetime between electrical charges (e.g., coupling the phone with household outlet power to recharge the power source for the phone).

Figure 6:
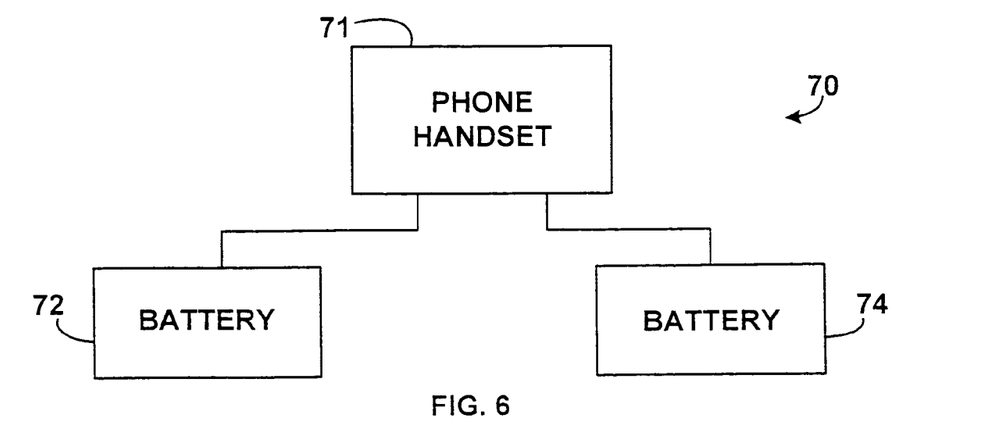
FIG. 6 is a block diagram illustrating a phone with a dual battery arrangement.

Referring to FIG. 6, a block diagram of a phone 70 that includes a dual battery arrangement is shown. Such a dual battery setup provides additional power resources for phones that have increased power consumption as compared to previous phones. The phone 70 includes a phone handset 71, which may be a handset that includes an enlarged display screen, such as the phones 30 and 40 of FIGS. 2 and 3. The phone handset 71 is coupled with a first battery 72 and a second battery 74 in an electrically parallel arrangement. With such a dual battery setup, because the batteries 72 and 74 are electrically coupled with the phone handset 71 in parallel, it is possible for a user of the phone 70 to "hot swap" one battery at a time during a phone call without dropping the connection. This is possible because the battery not being swapped will temporarily provide all of the power to operate the phone during the process of "swapping" the other battery (e.g., replacing a partially discharged battery with a fully charged battery). Another advantage of such an arrangement is that it allows for the use of existing form factor batteries for providing additional power resources. This approach reduces the need for designing and manufacturing a new, larger capacity battery to provide the additional power resources consumed by, for example, enlarged display phones.

Figure 7:
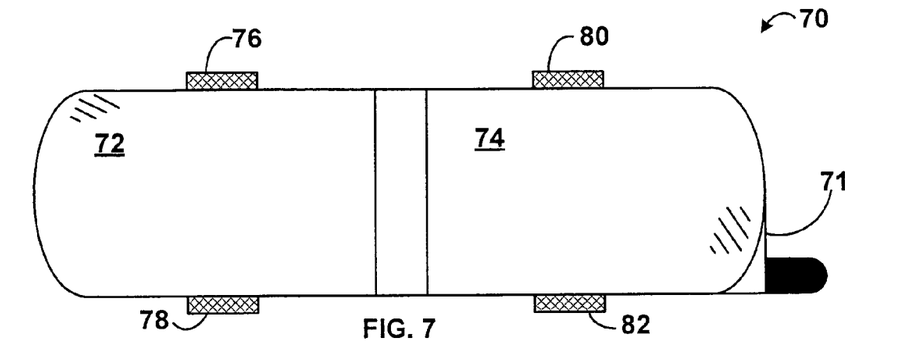
FIG. 7 is bottom view of phone implementing the arrangement illustrated in FIG. 6.

FIG. 7 is a bottom view of a specific implementation of the phone 70 of FIG. 6. The phone 70 in FIG. 7, for this discussion, will be assumed to include an enlarged display screen, such as have been previously described. As shown in FIG. 7, the phone 70 includes a phone handset 71, a first battery 72 and a second battery 74. The batteries 72 and 74 are electrically coupled in parallel with the phone handset 71. The battery 72 includes a first button 76 and a second button 78. Likewise, the battery 72 includes a first button 80 and a second button 82. The buttons 76 and 78 are used to release the battery 72 from the phone handset 71 in order to decouple (both mechanically and electrically) the battery 72 from the handset 71, such as during a "hot swapping" operation. Similarly, the battery 74 includes buttons 80 and 82, which are used to release the battery 74 from the phone handset 71.

Figure 8:
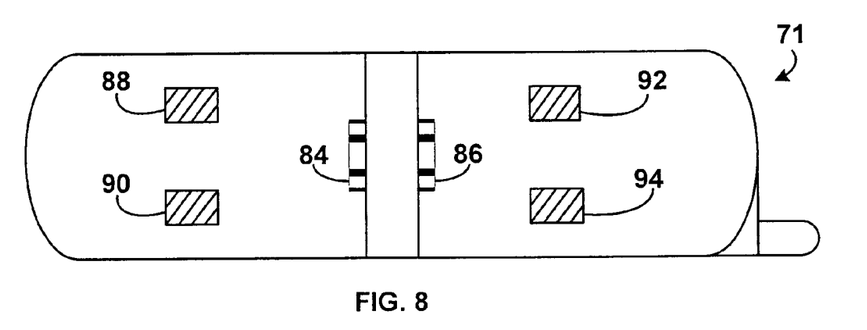
FIG. 8 is a bottom view of the phone of FIG. 7 with the batteries removed.
Figure 9:
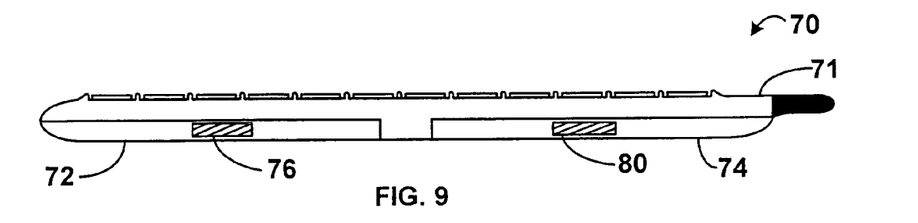
FIG. 9 is a side view of the phone of FIG. 7.

FIG. 8 is a bottom view of the phone handset 71 with the batteries 72 and 74 removed. FIG. 9 is a side view of the phone 70 of FIG. 7. The handset 71 includes contacts 84 and 86. The contacts 84, when the battery 72 is coupled with the handset 71, receive electrical power from the battery 72 for powering in the phone 70. Likewise, the contacts 86 receive electrical power from the battery 74 for powering the phone 70. As was discussed above, the use of two batteries in this arrangement will allow for longer battery life (time between charges) without the need to design and manufacture a larger single battery because such an approach may be implemented using batteries of existing form factors, such as batteries that are used with the phone illustrated in FIGS. 1A and 1B.

As shown in FIG. 8, the handset 71 includes a number of receiver holes 88, 90, 92 and 94. These holes are used in conjunction with retention structures included in the batteries 72 and 74 to couple the batteries with the handset 71. The retention structures are released using the buttons 76, 78, 80 and 82 to allow for the removal of the batteries, e.g. for hot swapping or charging in a separate battery charger (not shown). FIG. 9 shows the placement of the buttons 76 and 80 respectively on the battery 72 and the battery 74. The retention structure used depends on the particular embodiment. One example retention structure is illustrated in FIGS. 10 and 11.

Figure 10:
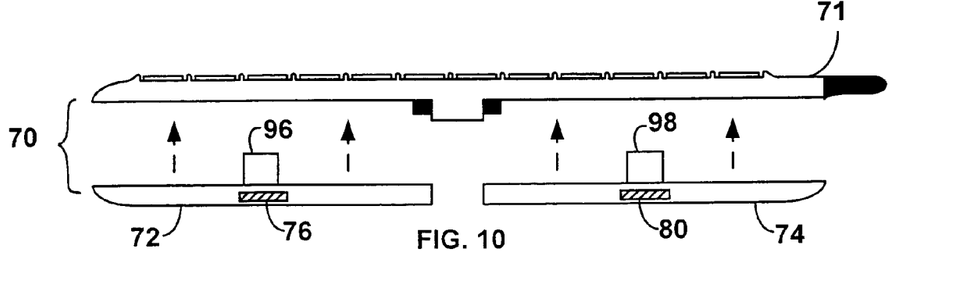
FIG. 10 is an exploded side view of the phone of FIG. 7.

FIG. 10 is an exploded side view of the phone 70 of FIG. 7 that illustrates a side view of retention structures 96 and 98 of the battery 72 and the battery 74, respectively. The retention structure 96 of the battery 72 corresponds with the receiver hole 88 of the handset 71, while the retention structure 98 corresponds with the receiver hole 92 of the handset 71. For example, as the battery 72 is moved in the direction of the arrows indicated in FIG. 10, the retention structure 96 will enter the receiver hole 88 and engage with the receiver hole 88 to fixedly couple the battery 72 with the handset 71. The battery 72 may then be removed by pressing the buttons 76 and 78, which will disengage the retention structure 96 from the receiver hole 88, allowing the battery to be removed from the handset 71. The battery 74 may be coupled with (and decoupled from) the handset 71 in the same manner as described for the battery 72.

Figure 11:
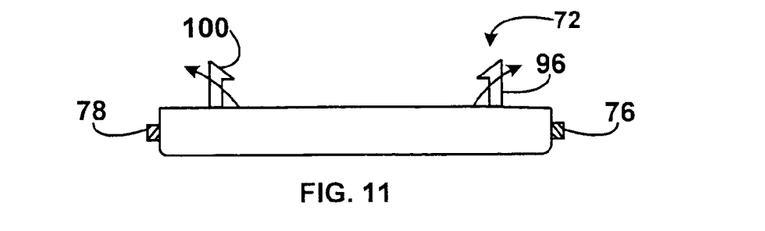
FIG. 11 is an end view of a battery of the phone of FIG. 7.

FIG. 11 is an end view of the battery 72, which shows the retention structure 96 and a second retention structure 100 in further detail. The second retention structure 100 corresponds with the receiver hole 90 in the handset 71. The retention structures 96 and 100 may be termed ramped hook structures. The retention structures 96 and 100, in this embodiment, are each held in their "engaged" position by a spring (not shown). In the context, the engaged position is a position that fixedly couples the battery 72 with the handset 71. The ramped top surfaces of the retention structures 96 and 100 allow those structures to be radially displaced (as is indicted by the arrows in FIG. 11) as they enter the receiver holes 88 and 90. After the ramped portions of the retention structures 96 and 100 have fully entered the receiver holes 88 and 90, the spring force on each structure will cause the retention structures 96 and 100 to engage with the receiver holes 88 and 90 and fixedly coupled the battery 72 with the handset 71.

In order to remove the battery 72 from the handset, the buttons 76 and 78 are depressed. This action opposes the spring force and causes the retention structures 96 and 100 to disengage from the receiver holes 88 and 90. Once the retention structures 96 and 100 are disengaged from the receiver holes 88 and 90, the battery 72 can be removed from the handset 71. The battery 74 is coupled with and decoupled from the handset 71 in substantially the same fashion as the battery 72, e.g., by engaging and disengaging the retention structure 98 and a second retention structure of the battery 74 (not shown) with the receiver holes 92 and 94 of the handset 71.

As is shown in FIGS. 7-11, the batteries 72 and 74 are of the same form factor and are, thus, interchangeable with one another. Further, the symmetric arrangement of the batteries 72 and 74 on the phone 70 also allows for interchangeability of the batteries 72 and 74.

Figure 12:
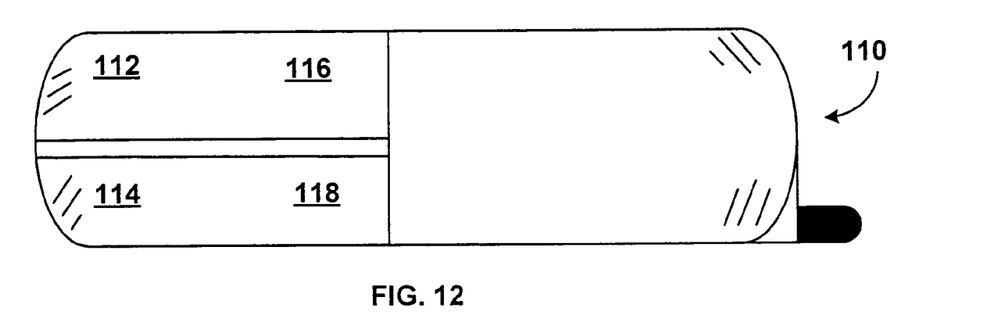
FIG. 12 is a bottom view of an alternative phone implementing the arrangement illustrated in FIG. 6.
Figure 13:
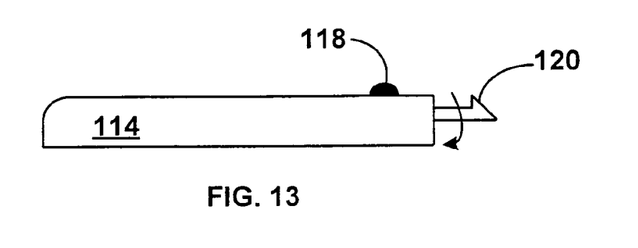
FIG. 13 is a side view of a battery of the phone of FIG. 12.

FIG. 12 is a bottom view of an alternative phone 110 with a dual battery arrangement. The phone 110 includes a first battery 112 and a second battery 114. The batteries 112 and 114 are located adjacent to one another at a single end of the phone 110. The battery 112 includes a button 118 which is used to disengage a retention structure so as to allow the battery 112 to be removed from the phone 110. Likewise, the battery 114 includes a button 118 for releasing a retention structure. The batteries 112 and 114 may further include guide structures (not shown) that slide in grooves (not shown) in the housing of the phone 110. FIG. 13 is a side view of the battery 114 of the phone 110 shown in FIG. 12. The battery 114 includes a retention structure 120 that operates in a similar fashion as the retention structures 96 and 100 described above. For the sake of brevity, the operation of the retention structure 120 (and the button 118) will not be described in detail here. However, it is noted that corresponding receiver holes for the battery 112 and the battery 114 would be included in the housing of the phone 110.

Figure 14:
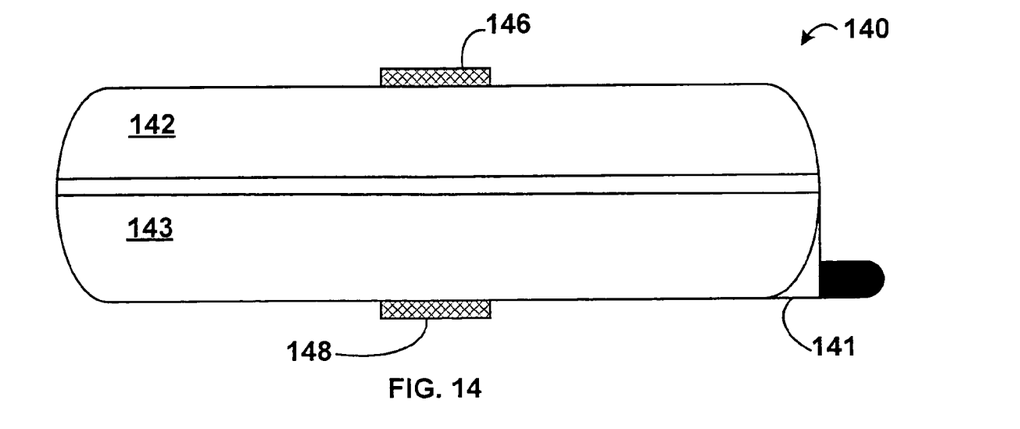
FIG. 14 is a bottom view of another alternative phone implementing the arrangement illustrated in FIG. 6.

FIG. 14 is a bottom view of another alternative phone 140 with a dual battery arrangement. The phone 140 includes a handset 141, a first battery 142 and a second battery 144. The battery 142 includes a button 146 and the battery 144 includes a button 148 for disengaging respective retention structures to allow the batteries 142 and 144 to be removed from the phone 140. The batteries 142 and 144 extend along the length of opposite sides of the phone 140 and are symmetrically arranged. As with the batteries 72 and 74 of the phone 70 shown in FIGS. 7-11, the batteries 142 and 144 are interchangeable. Due to the length of the batteries 142 and 144 in addition to a retention structure such as those described above, the batteries 142 and 144 may include a plurality of half-round structures (disposed on the interior edge of the batteries) that act as hinges to engage the inner edge of the batteries 142 and 144 with the housing of the phone 140. Of course, any appropriate structure may be used for this purpose.

CONCLUSION

Various arrangements and embodiments in accordance with the present invention have been described herein. It will be appreciated, however, that those skilled in the art will understand that changes and modifications may be made to these arrangements and embodiments, as well as combinations of the various embodiments without departing from the true scope and spirit of the present invention, which is defined by the following claims.

What is claimed is:

1. A phone comprising:
    an elongated housing having a top surface and a bottom surface;
    a display screen affixed to the housing, the display screen forming a majority of the surface area of the top surface of the housing;
    a keypad having a plurality of keys corresponding with the digits 0-9, the plurality of keys being sequentially positioned along a side of the display on the top surface, the key for the digit 0 being adjacent to one of the key for the digit 1 and the key for the digit 9;
    a first battery removably coupled with the bottom surface of the housing; and a second battery removably coupled with the bottom surface of the housing, wherein the housing comprises electrical contacts disposed on the bottom surface that, in operation, receive electrical power to operate the phone from the first battery and the second battery, and thus, in operation, the first and second batteries cooperatively provide power to operate the phone, wherein the first battery and the second battery are arranged substantially symmetrically with each other on the bottom surface of the housing, wherein the first battery has a first battery housing that operates as a first exterior portion of the phone when the first battery is removably coupled with the phone, and wherein the second battery has a second battery housing that operates as a second exterior portion of the phone when the second battery is removably coupled with the phone, wherein the first battery and the second battery are of identical form factor and are therefore interchangeable with each other, and wherein, when the phone is engaged in a call, (i) the first battery can be removed and the second battery provides sufficient power to power the phone without dropping the call and (ii) the second battery can be removed and the first battery provides sufficient power to power the phone without dropping the call.

2. The phone of claim 1, wherein the first battery and the second battery are electrically coupled in parallel.

3. The phone of claim 1, wherein the first battery is removably coupled with the bottom surface of the housing at a first end of the housing and the second battery is removably coupled with the bottom surface of the housing at a second end of the housing.

4. The phone of claim 1, wherein the first battery extends from one edge of the bottom surface of the phone to a center part of the phone, and the second battery extends from an opposing edge of the bottom surface of the phone to the center part of the phone.

5. The phone of claim 1, wherein the first battery is removably coupled with the bottom surface of the housing along substantially an entire first side of the housing and the second battery is removably coupled with the bottom surface of the housing along substantially an entire second side of the housing.

6. The phone of claim 1, wherein the first battery and the second battery are adjacently removably coupled with the bottom surface of the housing at a single end of the housing.

7. The phone of claim 1, wherein the keys for the digits 0-9 are positioned below the display in a substantially straight single row.

8. The phone of claim 7, wherein the plurality of keys further include a key for the character * and a key for the character # located at respective opposite ends of the keys for the digits 0-9.

9. A phone comprising:
an elongated housing having a top surface and a bottom surface;
a display screen affixed to the housing, the display screen forming a majority of the surface area of the top surface of the housing;
a keypad having a plurality of keys corresponding with the digits 0-9, the plurality of keys being sequentially positioned along a side of the display on the top surface, the key for the digit 0 being adjacent to one of the key for the digit 1 and the key for the digit 9;
a first battery coupled with the housing; and a second battery coupled with the housing, the first battery and the second battery being electrically coupled in parallel, wherein, in operation, the first and second batteries cooperatively provide power to operate the phone and wherein a single one of the first battery and the second battery provides sufficient electrical power to operate the phone, such that when the phone is engaged in a call, (i) the first battery can be removed and the second battery provides sufficient power to power the phone without dropping the call and (ii) the second battery can be removed and the first battery provides sufficient power to power the phone without dropping the call.

10. The phone of claim 9, wherein the first and second batteries are removably coupled with the bottom surface of the housing.

11. The phone of claim 10, wherein the housing comprises electrical contacts disposed on the bottom surface that, in operation, receive electrical power to operate the phone from the first battery and the second battery.

12. The phone of claim 9, wherein the first battery and the second battery are interchangeable.

13. The phone of claim 9, wherein the first battery is removably coupled with the bottom surface of the housing at a first end of the housing and the second battery is removably coupled with the bottom surface of the housing at a second end of the housing.

14. The phone of claim 9, wherein the first battery and the second battery are arranged substantially symmetrically on the bottom surface.

15. A phone comprising:
an elongated housing having a top surface and a bottom surface;
a display screen affixed to the housing, the display screen forming a majority of the surface area of the top surface of the housing;
a first battery removably coupled with the bottom surface of the housing; and
a second battery removably coupled with the bottom surface of the housing,
wherein the housing comprises electrical contacts disposed on the bottom surface that, in operation, receive electrical power to operate the phone from the first battery and the second battery, and thus, in operation, the first and second batteries cooperatively provide power to operate the phone,
wherein the first battery and the second battery are arranged substantially symmetrically with each other on the bottom surface of the housing, wherein the first battery has a first battery housing that operates as a first exterior portion of the phone when the first battery is removably coupled with the phone, and wherein the second battery has a second battery housing that operates as a second exterior portion of the phone when the second battery is removably coupled with the phone,
wherein the first battery and the second battery are of identical form factor and are therefore interchangeable with each other, and
wherein, when the phone is engaged in a call, (i) the first battery can be removed and the second battery provides sufficient power to power the phone without dropping the call and (ii) the second battery can be removed and the first battery provides sufficient power to power the phone without dropping the call.

16. The phone of claim 15, wherein the first battery and the second battery are electrically coupled in parallel.

17. The phone of claim 15, wherein the first battery is removably coupled with the bottom surface of the housing at a first end of the housing and the second battery is removably coupled with the bottom surface of the housing at a second end of the housing.

18. The phone of claim 15, wherein the first battery extends from one edge of the bottom surface of the phone to a center part of the phone, and the second battery extends from an opposing edge of the bottom surface of the phone to the center part of the phone.

19. The phone of claim 15, wherein the first battery is removably coupled with the bottom surface of the housing along substantially an entire first side of the housing, and the second battery is removably coupled with the bottom surface of the housing along substantially an entire second side of the housing.

20. The phone of claim 15, wherein the first battery and the second battery are adjacently removably coupled with the bottom surface of the housing at a single end of the housing.

* * * * *